UNITED STATES PATENT OFFICE.

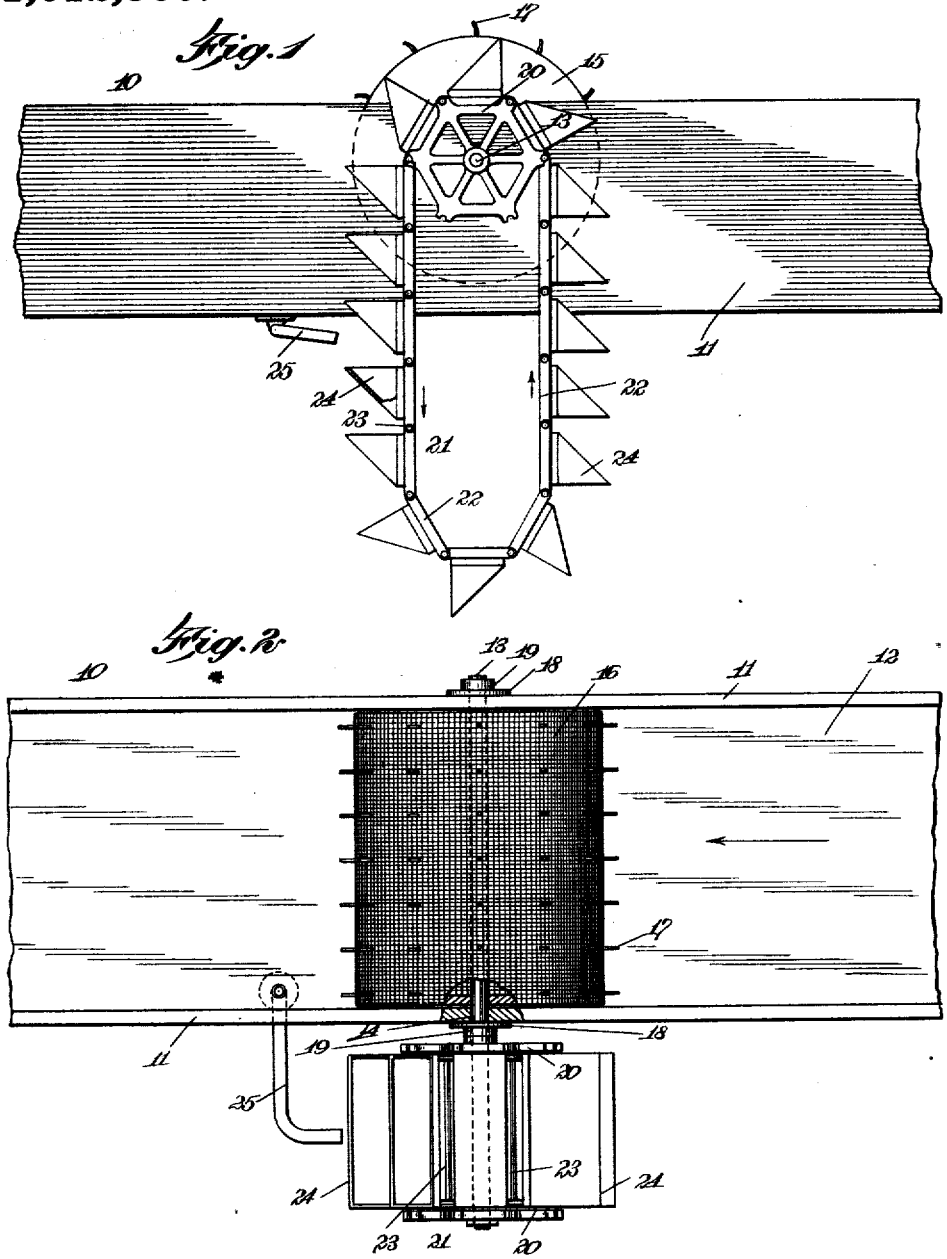

JOHN CHRISTEE AITKEN, OF WOODVILLE, OREGON.

FISH-SCREEN.

1,012,500.     Specification of Letters Patent.     Patented Dec. 19, 1911.

Application filed March 21, 1911. Serial No. 615,904.

*To all whom it may concern:*

Be it known that I, JOHN C. AITKEN, a citizen of the United States, and a resident of Woodville, in the county of Jackson and State of Oregon, have invented a new and Improved Fish-Screen, of which the following is a full, clear, and exact description.

This invention relates to fish screens for use with irrigating ditches, flumes, canals, or other water conduits, to prevent fish and the like from passing along the conduits, beyond the screens, and has reference more particularly to the combination with a water conduit, of a movable barrier therein, and a hydraulic motor operable by the water from the conduit, at a point remote from the barrier, and serving to drive the barrier in a direction counter to the flow of the current in the conduit.

An object of the invention is to provide a simple, strong and durable fish screen which can be used with water conduits of different kinds, to prevent fish or the like from passing along the conduits, which is self-cleaning and thereby prevents the accumulation of floating and other debris at the screen, which will not tend to clog or obstruct the conduit, which does not hinder the free flow of the water along the conduit, and which is easily accessible for purposes of replacement or repair.

A further object of the invention is to provide a device of the class described, which will operate at all times and at different depths of water in the conduit, which will keep itself clean at all times, regardless of the depth of the water or the rate of flow, and which does not depend for its operation, to any extent, upon the rate of flow of the water current.

The invention consists in the construction and combination of parts to be more fully described hereinafter and particularly set forth in the claims.

Reference is to be had to the accompanying drawings forming a part of this specification, in which similar characters of reference indicate corresponding parts in both views, and in which—

Figure 1 is a side elevation of a portion of a flume showing an embodiment of my invention applied thereto; and Fig. 2 is a plan view of the flume, certain parts of the flume and of the fish screen being shown in cross section.

Before proceeding to a more detailed explanation of my invention, it should be clearly understood that while the device has been illustrated as applied to a wooden or like flume, it can also be used with other types of water conduits adapted to the purpose. In sections of the country that require artificial irrigation, for example, systems of distributing canals or ditches are provided, through which water from suitable sources is conducted, for use at different points where necessary. Usually, storage basins or running streams are tapped to supply the water for the distributing ditches or flumes. If not prevented, fish of various species that pervade the sources of water supply will pass therefrom, into and through the ditches, and will thus be destroyed. My screen will prevent fish from passing through the ditches, flumes or other conduits, and will thus cause them to remain in or near the source of water supply.

Certain of the details of construction, shown for example, herewith, form no part of the invention, and can be varied in accordance with individual preference and special conditions, without deviating from the essence of the invention as defined in the appended claims.

Referring more particularly to the drawings, I have shown, for example, a flume or water conduit 10, in the form of an elongated trough having parallel side walls 11, and a bottom 12, the flume being preferably elevated above the ground. It is so arranged that the inlet of the flume is positioned at the outlet of the body of water that feeds the system of ditches, and my improved screen is located in the flume, near the end thereof that receives the volume of water for distribution. I employ with the device a shaft 13 journaled in suitable bearing openings 14 of the side walls 11 of the flume. The shaft extends materially at one end beyond the corresponding side wall of the flume. Within the flume, and near the side walls of the same, the shaft has rigidly mounted thereon the circular end walls of a drum, the end walls being joined by a strong, cylindrical envelop 16 of wire mesh or other, suitable, reticulate material, the cylindrical envelop being fastened upon the peripheral edges of the parts 15, in any suitable manner. I prefer to provide the surface of the screen with suitably spaced series of grab hooks 17, which are slightly curved. These hooks serve to engage any debris brought by the current against the screen, and carry it over and beyond the same, thereby preventing the flume from becoming clogged or obstructed.

The shaft 13 has secured thereon, adjacent to the side walls 11 of the flume, and at the outer sides of the same, washers 18 and collars 19, which serve to prevent lateral play of the screen, and position it centrally within the flume. At the projecting end, the shaft carries rigid, spaced sprockets 20, about which is arranged to travel, an endless member 21. The endless member consists of pivotally joined links 22, the corresponding links being connected by cross bars or rungs 23. Each pair of links and the cross bars of the same support a bucket 24, of substantially triangular cross-section, and having the opening upward when it is at one side of the chain, and downwardly disposed when at the other side of the chain. The endless member depends from the sprockets and hangs a material distance below the bottom of the flume. The latter has an outlet pipe 25 extending from the bottom 12, toward the endless member, so that the water escaping from the outlet pipe will fill the buckets at one side of the chain. The endless member with its buckets constitute a hydraulic motor, which serves to operate the screen in a direction counter to the flow of the current in the flume, the outlet pipe being positioned beyond the screen, for this purpose.

It will be understood, that as the buckets at one side of the member fill with water from the pipe 25, the additional weight at that side causes the endless member to be actuated gravitationally to rotate the shaft. As the buckets pass around the lower end of the endless member they are inverted, and the water can escape from them.

Having thus described my invention, I claim as new, and desire to secure by Letters Patent:—

1. The combination with a water conduit, of a movable barrier therein, and a hydraulic motor outside of said conduit operable by water from said conduit, at a point remote from said barrier, and serving to drive said barrier countercurrent-wise.

2. The combination with a water conduit, of a rotatable screen therein, a hydraulic motor operatively connected with said screen and positioned outside said conduit, and means for conducting water from said conduit to said motor to drive the same.

3. A device of the class described, comprising a shaft, a fish barrier mounted upon said shaft, and a hydraulic motor also mounted upon said shaft but otherwise independent of and spaced from said barrier, and serving to actuate said shaft to drive said barrier.

4. The combination with a flume, of a shaft arranged transversely of said flume, and extending beyond the same, a fish screen carried by said shaft, a water motor carried by said shaft, outside said flume, and a pipe for conducting water from the bottom of said flume to said water motor.

5. The combination with a flume, of a shaft arranged transversely of said flume and extending beyond the same, a barrier carried by said shaft to prevent fish from passing along said flume, a water motor carried by said shaft at the outside of said flume, and means whereby said water motor can be actuated by water escaping from said flume at a point remote from said barrier.

6. The combination with a flume having side walls and a bottom, of a shaft journaled in said side walls and extending at one end beyond a corresponding side wall, a fish screen carried by said shaft and comprising a reticulate cylinder, a water motor carried by said shaft at the outside of said flume, and a pipe for conducting water from the bottom of said flume to said water motor.

7. The combination with a flume having side walls and a bottom, of a shaft journaled in said side walls and extending at one end beyond a corresponding side wall, a fish screen carried by said shaft and comprising a reticulate cylinder, a sprocket mounted upon said shaft outside said flume, an endless member depending from said sprocket and adapted to travel around the same, buckets carried by said endless member, and a pipe for conducting water from the bottom of said flume to fill the buckets at one side of said endless member.

In testimony whereof I have signed my name to this specification in the presence of two subscribing witnesses.

JOHN CHRISTEE AITKEN.

Witnesses:
GEORGE LOUD,
R. M. McLEAN.